United States Patent Office 3,142,453
Patented July 28, 1964

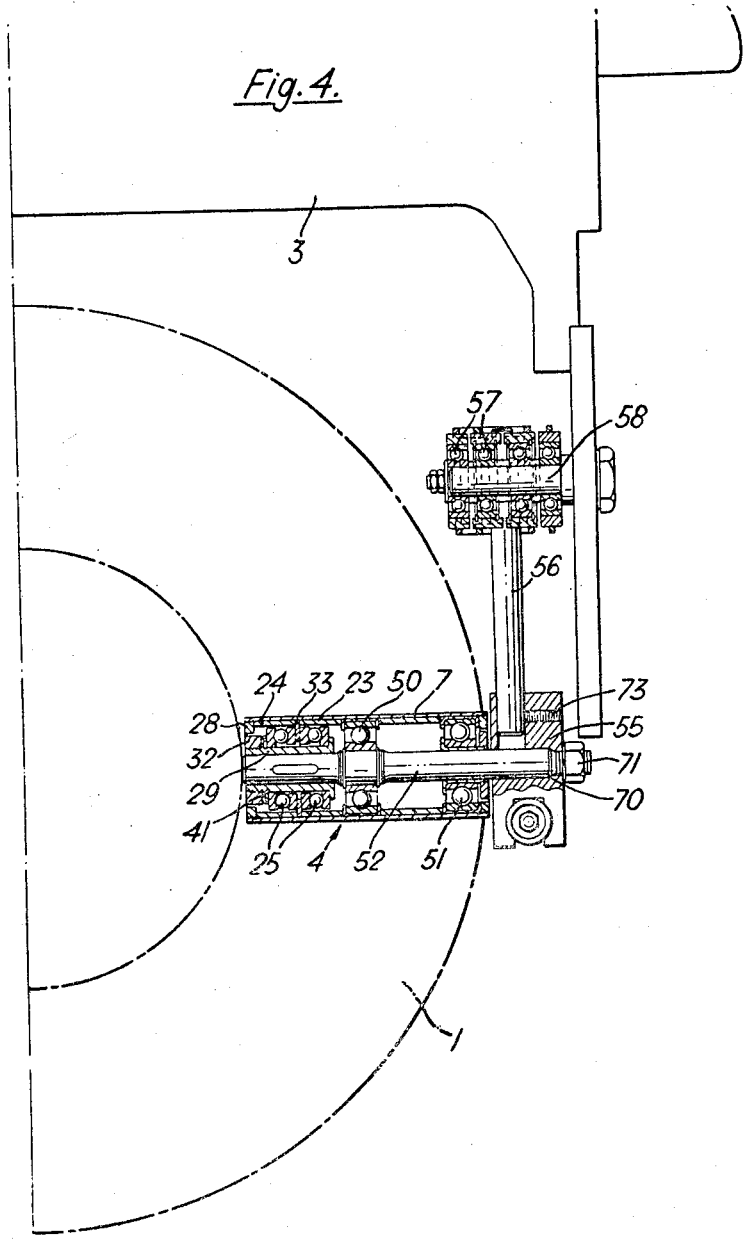

3,142,453
APPARATUS FOR CONTROLLING THE TENSION IN TAPES
George Thomas Wilson Grieve and Harold William Ritchie Watson, both of London, England, assignors to British Insulated Callender's Cables Limited, London, England, a British company
Filed Aug. 29, 1961, Ser. No. 134,673
Claims priority, application Great Britain Sept. 2, 1960
11 Claims. (Cl. 242—75.47)

This invention relates to a method of and apparatus for controlling the tension in tapes, especially in tapes being drawn off from a roll or pad and lapped helically upon a core, for instance an electric cable conductor, or wound spirally on a core as in the manufacture of wound capacitors.

When drawing off tape from a convolute roll or a spirally wound disc of the material (each hereinafter for convenience referred to as a "pad") for application to an elongated body by a wrapping or lapping process, it is desirable to use a pad of which the initial diameter is as great as practicable. For example, it is common practice for paper cable makers to use pads of 16 inch diameter. In some cases pads of 25 inch diameter have been used. To prevent over-running of such pads it is essential to apply a braking load which imposes a tension in the paper being drawn off from the pad. Especially in the case of supertension paper cable manufacture is it desirable that this tension should remain constant within close limits. As more and more tape is drawn off from the pad the braking torque necessary to prevent over-running naturally diminishes. At the same time the tension imposed on the paper by a given braking torque on the pad increases. Numerous devices have been suggested for effecting a gradual reduction in the braking torque as the pad diameter is gradually reduced, with the object of ensuring that the tension in the tape as it runs on to the core on which it is to be helically lapped or convolutely wrapped remains substantially constant. In practice it has been found that with known forms of devices for applying braking torque, which depend upon rubbing friction between a rotating surface and a brake shoe or disc pressing upon such surface, the braking torque increases as the speed at which tape is being drawn off increases from a crawl speed to full speed, which latter may be of the order of, say 200 ft. per minute. By the present invention we provide a novel form of tension control device which enables the tension in the tape being drawn off to be maintained within closer limits at a predetermined value despite the gradual reduction in diameter of the pad and variations in the speed at which tape is drawn off.

In accordance with our invention our novel form of tension control device comprises one or more than one rotatable member arranged to be driven in rotation at a speed proportional to the linear speed at which tape is drawn off from the pad and means for applying to the pad through the rotatably driven member, or to one or each of more than one of the rotatably driven members, a controlled braking torque which is derived from the elastic deformation of at least one metal surface and of which the value is substantially unaffected by changes in the speed of rotation of the rotatably driven member.

We prefer to control the value of the braking torque applied to the rotatably driven member or to each of several such members by adjusting the value of the axial thrust between races of an anti-friction thrust bearing which rotate relative to one another at a speed equal to or proportional to the speed of the rotatably driven member. The retarding torque so obtained is due to the work done in elastically deforming the balls or rollers and their races as they are pressed against and roll over them and it varies with the pressure exerted between the races and, providing the bearings are lubricated with a lubricant of low viscosity, i.e. one having a viscosity at 60° C. not substantially greater than 130 Redwood seconds is independent of speed of rotation of the rotatably driven member.

The term "anti-friction thrust bearing" is used herein to mean a ball or roller thrust bearing comprising a series of balls or rollers running between the neighbouring end faces of a pair of annular discs or a ball thrust bearing comprising a series of balls running between the external circumferential surface of an inner race and the internal circumferential surface of an outer race. We have found that for a given pressure applied between the two races of an anti-friction thrust bearing, the resulting retarding torque remains substantially constant throughout a large range of angular velocities, whereas a retarding torque developed by applying a friction pad or band brake to a rotatably driven member varies very considerably as the speed varies. Though both types of thrust bearing may be used, we prefer to use a thrust bearing employing annular discs as races for the retarding torque developed is more nearly constant over each revolution of the roller than that obtained from a thrust employing inner and outer races.

To enable the invention to be more fully understood a description will now be given by way of example of how the invention may be applied to heads of paper tape lapping machines of the kind in which each of the pads on a head is mounted with its side walls approximately parallel to a plane containing the machine axis. In the drawings accompanying this specification:

FIGURE 4 is a view partly in section and partly in elevation showing a modified form of the tension control device applied in a different way to one of a number of pads of paper tape carried on a head of such a lapping machine.

Figure 1:
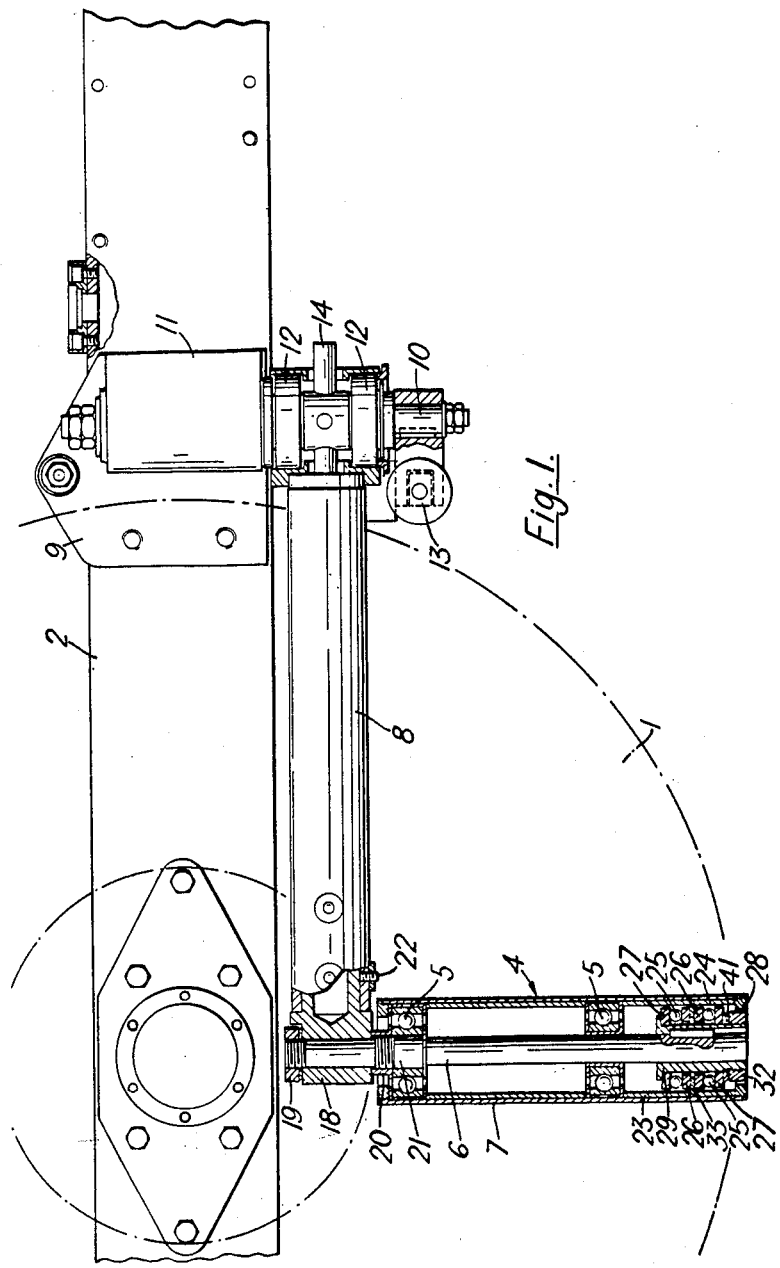
FIGURE 1 is a view partly in section and partly in elevation of one form of the tension control device applied to one of a number of pads of paper tape carried on a head of such a lapping machine.
Figure 2:
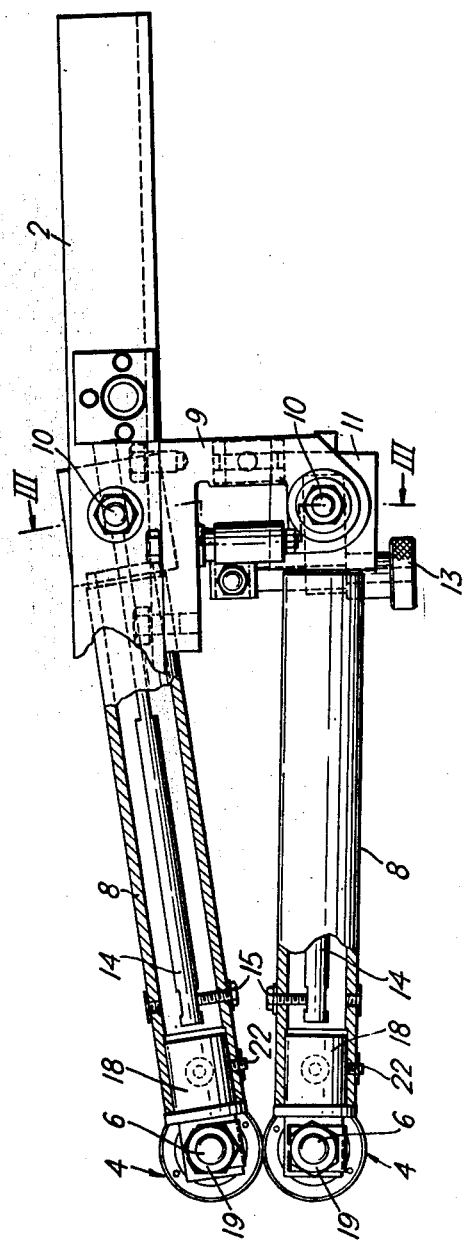
FIGURE 2 is a plan view partly in section of the tension control device shown in FIGURE 1 with the pad removed.
Figure 3:
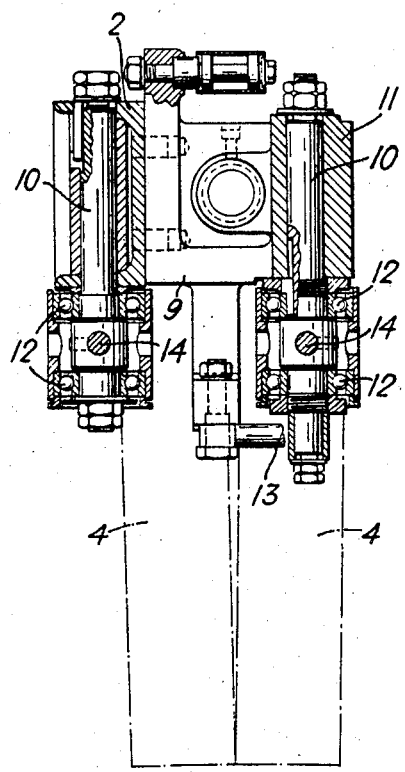
FIGURE 3 is a view partly in section and partly in elevation taken on the line III—III in FIGURE 2.

In the lapping machine to which the tension control device shown in FIGURES 1, 2 and 3 is applied, each of the pads of paper tape is mounted with its side walls approximately parallel to a plane containing the machine axis, on a carrier supported in bearings on a beam extending parallel with the machine axis between front and rear rotatable support plates. FIGURE 1 shows one such pad 1 and its supporting beam 2. The tension control device for this pad 1 comprises a pair of cylindrical rollers 4 mounted one on each side of the pad 1 and each with its axis lying in a plane radial to or approximately radial to that of the machine. Each roller 4 has an outer steel sleeve 7 which is supported on a pair of ball bearings 5 on a stationary spindle 6 inclined at an angle of 1° to the adjacent side face of the pad 1. The spindle 6 projects from the inner end of the roller 4, i.e. the end that is the nearer to the pad carrier axis, and this projecting end is secured to the free end of a tubular arm 8 which extends alongside the beam 2 and is connected at its other end to a stub shaft 10 supported in bearings 12 carried by the rotatably driven head of the machine. The axis of this pivot is at approximately right angles to the axis of the pad carrier and its bearing so that the roller 4 can swing towards and away from the neighbouring face of the pad 1. The stub shaft 10 to which the tubular arm 8 of one of the rollers 4 is pivotally connected is mounted on the beam 2 and is keyed to prevent it from rotating. The stub shaft 10 to which the tubular arm 8 supporting the other roller 4 is pivotally connected is carried in a housing 11 which is attached to a bracket 9 secured to the beam 2 and this stub shaft is locked against rotation by a releasable locking device 13. When it is required to replace the pad 1 by a fresh pad the locking device 13 is released and this stub shaft is rotated on its axis to swing the tubular arm 8 and roller 4 carried by the shaft clear of the neighbouring face of the pad a sufficient distance to allow the pads to be changed. The tubular arm 8 and roller 4 can be swung back to their original position after the pads have been changed and the stub shaft 10 locked against rotation by the releasable locking device 13.

Each tubular arm 8 is spring biased in a direction to maintain the roller 4 which it carries in driving engagement with the rim of the side wall of the pad 1. This is effected by a bar spring 14 projecting radially from the stub shaft 10 to which the tubular arm 8 is hinged and extending along the bore of that arm. Each stub shaft 10 is locked in such a position as to maintain the bar spring 14 and the tubular arm 8 which it carries in a position in which, in the absence of a pad, the roller 4 carried by the arm makes contact with the roller 4 carried by the corresponding arm 8 on the other side of the pad 1 in the central plane of the pad. Separation of the rollers 4 causes the arms 8 to pivot on their bearings 12 and by means of studs 15 projecting inwardly from the walls of the arms and engaging the free ends of the bar springs 14, elastically deflects the bar springs thus creating spring forces urging the arms 8 and their rollers 4 towards the pad 1. Adjustment of the spring loading for a given width of pad is obtained by adjustment of the effective lengths of the studs 15 engaging the bar spring 14. It will be appreciated that as the width of the pad 1 increases so will the pressure exerted on it by the rollers 4 automatically increase. This increase may not suffice however for pads of tape above a certain width because it is the practice in cable lapping to relate tape thickness to tape width. In consequence the tension required to be imposed in the tape to secure proper lapping does not increase linearly with tape width but more or less exponentially therewith. We, therefore, prefer to use a single bar spring 14 in each tubular arm 8 to supply the spring force required to urge the roller 4 into driving contact with pads of up to a certain width and to augment the spring 14 by a second bar spring (not shown) to deal with pads of greater width. This second bar spring may be mounted at one end on the same stub shaft as the first bar spring 14 and extend alongside but spaced from it so that it may be engaged by the outer end of the first spring 14 when that has deflected to a predetermined extent corresponding to a pad of certain width. As the rollers 4 move apart to deal with pads of greater width they are each urged into driving engagement by both springs acting together.

As previously mentioned the steel sleeve 7 of each roller 4 is supported on a pair of ball bearings 5 on a fixed spindle 6. An eye member 18 is adjustably clamped in the free end of the tubular arm 8 by a grub screw 22 passing through the arm wall and engaging the wall of the eye member. One end of the spindle 6 fits in a bore in the eye member and is held by clamping the eye member between a nut 19 screwed on to the extreme end of the spindle 6 and a flanged collar 20 screwed on to an enlarged part 21 of the spindle. The eye member 18 and its spindle 6 are rotatable about the axis of the arm 8 and angularly positioned at the required inclination to the end face of the pad 1 by the grub screw 22.

In the outer part of the steel sleeve 7 of the roller 4 that overhangs the ball bearings 5 by which the sleeve is supported are inserted a pair of single ball thrust washers 25 whose races have an external diameter that is smaller than the internal diameter of the sleeve. The neighbouring races 26 of the two washers 25 bear against the opposite end faces of an abutment ring 33 which has an external diameter that corresponds to the internal diameter of, and which is constrained to rotate with, the steel sleeve 7. The abutment ring 33 is spaced from the outer ball bearing 5 by a spacer sleeve 23 and is held in place by a second spacer sleeve 24 and a ring 28 screwed into the projecting internally screw threaded outer end of the steel sleeve 7. The pair of single ball thrust washers 25 serve as the means for applying the major part of the braking torque to the steel sleeve 7 constituting the roller 4 for engaging the pad 1. The neighbouring races 26 of the two washers which bear against the end faces of the abutment ring 33 are driven in rotation via the abutment ring by the steel sleeve 7 and the end races 27 are held against rotation by being clamped between the flange of a flanged bush 29 slidable on the outer end of the spindle 6 but feather-keyed to it and a nut 32 screwed on to the other end of the bush. By suitably dimensioning the nut 32 and the flange of the bush 29 or, as shown, by insertion of washers 41 of small external diameter, application of pressure to the two end races 27 is preferably confined to their radially inner parts as we have found that unless this is done the braking torque resulting from elastic deformation of the thrust washer races and balls is apt to vary during the course of each complete revolution of the roller 4.

Figure 5:
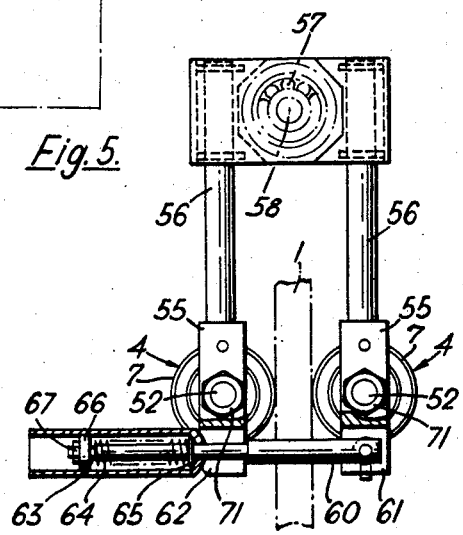
FIGURE 5 is an end view partly in section of the tension control device shown in FIGURE 4.

FIGURES 4 and 5 illustrate a modified form of our tension control device and where applicable in the description of this modified form the same reference numerals will be used for parts of the device which correspond to those of the tension control device described with reference to FIGURES 1 to 3. In the lapping machine to which the modified form of our tension control device is applied each of the pads of paper tape carried on the head is mounted with its side walls approximately parallel to a plane containing the machine axis on a carrier supported in bearings carried by a rotatably driven hub. FIGURE 4 shows one such pad 1 and its rotatably driven hub 3. The modified tension control device for this pad 1 comprises a pair of cylindrical rollers 4 mounted one on each side of the pad 1 and each with its axis parallel or approximately parallel to that of the machine. Each roller 4 has an outer steel sleeve 7 which is supported on a pair of ball bearings 50 and 51 on a stationary spindle 52 inclined at an angle of 1° to the adjacent side face of the pad. The spindle 52 projects from the outer end of the roller 4, i.e. the end that is farther from the pad carrier axis, and this projecting end passes through the bore of an eye member 55 adjustably clamped by a grub screw 73 to the free end of an arm 56 which lies in a plane radial or approximately radial to the machine and is pivotally attached at its other end by bearings 57 to a stub shaft 58 secured to the lapping head. The axis of this pivot is at right angles to the axis of the pad carrier and its bearing so that roller 4 can swing towards and away from the neighbouring face of the pad 1. Each arm 56 is spring-biased in a direction to maintain the roller 4 which it carried in driving engagement with the rim of one side wall of the pad. This is effected by means of a rod 60 one end of which is pivotally mounted in a clevis end 61 of one of the eye members 55 with its axis of rotation parallel to that of the rollers 4. The rod 60 is of reduced cross-section over a part of its length and this part passes through and projects beyond a clevis end 62 of the eye member 55 on the other side of the pad 1. A tubular housing 63 surrounds the projecting part of the rod 60 and is urged against the clevis end 62 by a helical spring 64 carried on the projecting part of the rod and held in compression between a washer 65 bearing against the inwardly flanged end of the tubular housing and a bearing plate 66 and nut 67 screwed on to the extreme end of the rod. Adjustment of the spring loading of the arms 56 for a given width of pad is obtained by tightening or slackening of the nut 67 and so controlling the spring force urging the rollers 4 together. The tubular housing 63 also serves as a handle for the device.

The steel sleeve 7 of each roller 4 is supported on a pair of ball bearings 50 and 51 on the stationary spindle 52. One end of the spindle 52, which is stepped to form a shoulder 70, fits into a stepped bore in the eye member 55 at the free end of the arm 56 and is held by clamping the eye member between a nut 71 screwed on to the extreme end of the spindle 52 and the shoulder 70 on the spindle abutting the step in the bore of the eye member. The eye member 55 and spindle 52 are rotatable about the axis of the arm 56 and angularly positioned at the required inclination to the end face of the pad 1 by the grub screw 73 passing through the wall of the eye member and engaging the arm.

As in the first example a spacer sleeve 23, a pair of single ball thrust washers 25, separated by an abutment ring 33 and a second spacer sleeve 24 are inserted in the part of the steel sleeve 7 that projects beyond the ball bearings 50 and these inserted parts are held in place by a ring 28 screwed into the end of the steel sleeve. The pair of single ball thrust washers 25 serve as the means for applying the major part of the braking torque to the steel sleeve 7 constituting the roller 4, the parts of the thrust washers being assembled in the same manner as in the first example.

In each of the tension control devices hereinbefore described by arranging the two rollers to bear upon the peripheral edges of the side walls of the pad we ensure that the radius at which the retarding force is applied to the pad always closely approximates to the radius at which tape is being drawn off from the pad. As the retarding force itself can be closely controlled and is substantially independent of the peripheral speed of travel of the pad (which is dependent upon the linear speed at which tape is drawn off) the tension applied to the tape remains very much more nearly constant than in all other tension control devices known to us.

As the occurrence of rubbing friction makes it difficult to maintain tension substantially constant at all linear speeds of take-off, the pressure exerted by each roller upon the peripheral edge of its neighboring side wall of the pad must be sufficient to reduce slip at the roller surface to a minimum. To this end also the radial width of the annulus of wall surface engaged by the roller at the periphery of the pad must be small, for the wider this annulus of contact, the greater the difference between the peripheral speeds of the inner and outer edges of the annulus, and the greater the slip. As indicated, an angle of inclination of roller axis to side wall of pad of 1° is satisfactory in the case of a cylindrical roller. The angle of inclination may in some cases be substantially greater than 1° but the greater the angle the greater the risk of damaging the edges of the tape and especially in the case of very thin paper tapes such as are now in current use in the manufacture of impregnated paper cables for voltages of 275 kv. and higher.

The diameter of the roller and the pressure required to substantially eliminate slip in the drive applied to it by the rotating pad will depend upon the nature of the material. Where only one pair of rollers is used and the retarding force is applied substantially entirely by the one roller, the two rollers of the pair must press against the pad with a load slightly in excess of the product of desired tension and the reciprocal of the coefficient of friction between roller and pad. For pads wound of dry paper tape having a thickness of 0.005 inch and a width of 0.5 inch we have found a pressure of 10 pounds to be satisfactory using rollers of 2.0 inch diameter, one of which is free running and the other of which is subjected to a controlled retarding force which, in conjunction with pad hub bearing friction and normal bearing friction arising in the roller bearings, results in a tension of about 4½ ozs. Where, as in each of the devices described, controlled retarding forces are applied to both rollers of a pair, the tension in the tape being drawn off is for the most part the result of both the controlled retarding forces so that the pressure between each roller and the pad may be nearly halved. Where more than two pairs of rollers are used, the pressure between each roller of a pair and the pad may be further reduced. Where $n$ pair of rollers ($n$ being a whole number greater than 2) are used at an angle of $2\pi/n$ radians apart, the rollers may also serve in place of a central carrier to locate the pad in its operative position.

What we claim as our invention is:

1. For controlling the tension in tape being drawn off from a pad and wound upon a core, a tension control device comprising at least one member which is rotatable about its own axis and is adapted to be rotatably driven by the pad about the said axis at a speed proportional to the linear speed at which tape is drawn off from the pad, and means for applying to the pad through the rotatably driven member a controlled braking torque, said last means comprising two relatively rotatable members urged towards each other to deform elastically successive portions of a surface of at least one of the members, one of said members being driven by said rotatably driven member and being retarded by the force required to deform said surface.

2. For controlling the tension in tape being drawn off from a pad and wound upon a core, a tension control device comprising at least one member which is rotatable about its own axis and engages the peripheral edge of the pad so as to be rotatably driven by the pad about the said axis at a speed proportional to the linear speed at which tape is drawn off from the pad, and means for applying to the pad through the rotatably driven member a controlled braking torque, said last means comprising two relatively rotatable members urged towards each other to deform elastically successive portions of a surface of at least one of the members, one of said members being driven by said rotatably driven member and being retarded by the force required to deform said surface.

3. For controlling the tension in tape being drawn off from a pad and wound upon a core, a tension control device comprising at least one member which is rotatable about its own axis and is adapted to be rotatably driven by the pad about its axis at a speed proportional to the linear speed at which tape is drawn off from the pad, and means for applying to the pad through the rotatably driven member a controlled braking torque of which the value is substantially unaffected by changes in the speed of rotation of the rotatably driven member, the last said means comprising at least one anti-friction thrust bearing having relatively rotatable races, means for rotating said races relative to one another at a speed proportional to that of said rotatably driven member and means for adjusting the value of the axial thrust between the said races.

4. For controlling the tension in tape being drawn off from a pad and wound upon a core, a tension control device including a pair of rollers, each rotatably mounted on a stationary spindle and arranged one on each side of the pad to bear upon a peripheral edge of the neighbouring side wall of the pad and to be rotatably driven by the pad as tape is drawn off, and means for applying to the pad through at least one of said rollers a controlled braking torque of which the value is substantially unaffected by changes in the speed of rotation of the roller, the last said means comprising at least one anti-friction thrust bearing having relatively rotatable races, means for constraining one of said races to rotate with the roller, means for restraining the other of said races from rotating about the axis of said spindle, and means for adjusting the axial thrust between the two races of the anti-friction thrust bearing.

5. A tension control device as claimed in claim 4, in which the anti-friction thrust bearing comprises a series of balls running between the neighbouring end faces of a pair of annular races.

6. A tension control device as claimed in claim 4, in which each roller has its axis inclined at a small angle to the plane containing the neighbouring side wall of the pad and means are provided for urging the roller to move bodily towards the pad in a direction parallel to the axis of the pad whereby to maintain the roller in engagement with the peripheral edge of the neighbouring side wall of the pad.

7. A tension control device as claimed in claim 6, in which the angle of inclination of the roller with respect to the plane containing the neighbouring side wall of the pad is approximately 1°.

8. A tension control device for controlling the tension in tape being drawn off from a pad and lapped helically upon a core in a lapping machine of the kind in which the pad is mounted on a rotatably driven lapping head with its side walls approximately parallel to a plane containing the axis of the machine, which device comprises a pair of tubular arms arranged one on each side of the pad with each arm approximately parallel to the machine axis, means for pivotally securing one end of each arm to a support so as to be capable of pivoting about an axis at right angles to the arm and at right angles to the axis of the pad, means for urging together the free ends of the two arms, a spindle projecting from the free end of each arm in a direction at right angles to the arm and with its axis substantially intersecting the pad axis and inclined at a small angle towards the adjacent side wall of the pad, a roller supported on each spindle by a pair of bearings and running on the peripheral edge of the adjacent side wall of the pad so as to be rotatably driven by the pad as tape is drawn off, and housed within each roller an anti-friction thrust bearing having relatively rotatable races, means for constraining one of said races to rotate with the roller, means for restraining the other of said races from rotating about the axis of the spindle and means for adjusting the value of the axial thrust between the said races whereby to apply to the pad through the roller a braking torque of which the value is substantially unaffected by changes in the speed of rotation of the roller.

9. A tension control device as claimed in claim 8, in which the means for pivotally securing one end of each tubular arm to the support comprises a stub shaft locked against rotation about its axis and carried by the rotatably driven head of the machine, and in which the means for urging the free ends of one of the two tubular arms towards that of the other comprises at least one bar spring secured at one end to the stub shaft and extending from that end along the bore of the tubular arm secured to said stub shaft and means carried at the free end of said bar spring for laterally adjusting the position of said bar spring in the bore for the purpose of maintaining the roller supported by said arm in driving engagement with the peripheral edge of the adjacent side wall of the pad.

10. A tension control device for controlling the tension in tape being drawn off from a pad and lapped helically upon a core in a lapping machine of the kind in which the pad is mounted on a rotatably driven lapping head with its side walls approximately parallel to a plane containing the axis of the machine, which device comprises a pair of supporting arms arranged one on each side of the pad with each arm lying substantially at right angles to the machine axis and substantially parallel to the side walls of the pad, means for pivotally securing one end of each arm to a support so as to be capable of pivoting about an axis parallel to the machine axis, means for urging together the free ends of the two arms, a spindle mounted on the free end of each arm and projecting therefrom in a direction at right angles to the arm and with its axis substantially intersecting the pad axis and inclined at a small angle away from the adjacent side wall of the pad, a roller supported on each spindle by a pair of bearings and running on the peripheral edge of the adjacent side wall of the pad so as to be rotatably driven by the pad as tape is drawn off, and housed within each roller an anti-friction thrust bearing having relatively rotatable races, means for constraining one of said races to rotate with the roller, means for restraining the other of said races from rotating about the axis of the spindle and means for adjusting the value of the axial thrust between the said races whereby to apply to the pad through the roller a braking torque of which the value is substantially unaffected by changes in the speed of rotation of the roller.

11. A tension control device as claimed in claim 10, in which the means for pivotally securing one end of each supporting arm to the support comprises a stub shaft locked against rotation about axis and secured to the rotatably driven head of the machine, and in which the means for urging together the free ends of the two supporting arms comprises a rod pivotally connected at one of its ends to the free end of one supporting arm, an adjustable abutment on the free end of the rod which projects beyond the other supporting arm and a compression spring between the last said arm and the said abutment.

References Cited in the file of this patent

UNITED STATES PATENTS

| | | |
|---|---|---|
| 911,412 | Lang | Feb. 2, 1909 |
| 1,686,530 | Morris et al. | Oct. 9, 1928 |
| 1,875,111 | Nieman | Aug. 30, 1932 |
| 1,987,141 | Casper | Jan. 8, 1935 |
| 2,462,766 | Olson et al. | Feb. 22, 1949 |
| 2,941,853 | Bartholomaus | June 21, 1960 |